Aug. 30, 1966  H. FLEISCHER  3,269,630
STAPLING INSTRUMENT
Filed April 30, 1964  7 Sheets-Sheet 1

INVENTOR:
HARRY FLEISCHER
BY
Flynn, Moran & Jangarathis
ATTORNEYS.

Aug. 30, 1966  H. FLEISCHER  3,269,630
STAPLING INSTRUMENT
Filed April 30, 1964  7 Sheets-Sheet 7

INVENTOR:
HARRY FLEISCHER
BY
Flynn, Marn & Jangarathis
ATTORNEYS.

United States Patent Office 3,269,630
Patented August 30, 1966

3,269,630
STAPLING INSTRUMENT
Harry Fleischer, 700 Park Ave., New York, N.Y.
Filed Apr. 30, 1964, Ser. No. 363,803
19 Claims. (Cl. 227—107)

This invention relates to medical instruments and, more particularly, to a stapling instrument for performing a multiple stitching operation upon an organ, for example, the bronchial stump, by means of a plurality of simultaneously applied metallic or non-metallic staples.

Heretofore, the utilization of instruments for multiple stitching, for example, the instrument described and depicted in U.S. Patent No. 3,080,564, issued March 12, 1963, has been characterized by (1) the instrument first being manipulated so that the stapling jaws thereof are placed about the organ to be sutured, (2) the distance between such jaws then being adjusted in accordance with the size of the organ, and (3) upon such manipulation and adjustment, one of the stapling jaws being activated to expel a plurality of staples stored therein. Generally, the adjustment of the distance between the stapling jaws has been accomplished by the prior art instruments by means of a screw mechanism, the operation of which is separate from and independent of the manual task of maintaining the instrument in the desired spacial position about the organ to be sutured. Thus, such prior art instruments do not provide the obvious need for an instrument for multiple stitching that is susceptible to complete one-hand operation.

In view of the need for efficient sterilization, and the desirability of rapid and repeated uses of a single instrument rather than single use of each of a multiplicity of instruments, there is need for a stapling instrument of few parts and minimal complexity. Further, it is highly desirable that the components of such an instrument be so interrelated that no tool or other apparatus is necessary for the assembly or disassembly of the instrument. Also, in those situations wherein the surgical operation to be performed calls for a plurality of multiple stitchings, there is a need for a stapling instrument of the type enabling prompt replacement of staple magazines, such magazines having various staple orientations.

It is a general object of this invention, therefore, to provide an improved stapling instrument of minimal complexity which may be manipulated to grip the part or parts to be sutured by a one-hand operation and, thereafter, activated to drive and clinch a plurality of staples in place by the mere continuance of such one-hand operation.

A further object of the present invention is the provision of an improved medical instrument for multiple stitching which is adapted to readily receive, by manual insertion requiring no tools or other apparatus, replaceable staple magazines and replaceable anvils, each combination comprising one such magazine and an associate anvil enabling the stapling instrument to provide a distinct multi-stitching design.

The invention may be readily understood by reference to the following detailed description of an instrument forming a specific embodiment thereof when read in conjunction with the appended drawings in which.

With continued reference to the drawings, there is illustrated a stapling instrument 10 comprising: a base handle assembly 11; an anvil assembly 12 attached to the handle assembly 11 in a manner permitting a limited sliding motion of the former with respect to the latter along a common longitudinal axis; a drive handle 13 coupled to the handle assembly 11 and the anvil assembly 12 for adjusting the distance between such assemblies and for activating the base handle assembly 11 to expel staples housed therein on a single angular movement of the handle 13; and a calibration coupler 14 comprising a drive axle 15 which extends through the assemblies 11 and 12 and the handle 13 for providing the interrelated mechanical coupling therebetween.

The base handle assembly 11 comprises a generally hollow, rigid frame 16 having two perpendicularly related elongated frame members 17 and 18. The frame member 17 is so configured as to define a hollow staple housing 19 at one end thereof and a hollow guide 20, including a top wall 21 and a pair of side walls 22 and 22'. The side walls 22 and 22' extend into the vicinity of the junction of the frame members 17 and 18 wherein they join a pair of parallel guide walls 23 and 23'. In longitudinal alignment with the frame member 17, there is provided a pair of apertures 24 and 24', and a pair of apertures 25 and 25', one aperture of each of such pairs being located in the guide wall 23, and the other aperture of each of such pairs in the guide wall 23'. The apertures 24 and 24' are circular, are axially aligned with respect to each other, and are centrally located at the junction of the frame members 17 and 18. The apertures 25 and 25', on the other hand, are elongated, are positioned directly opposite to each other, and extend in longitudinal alignment with the frame member 17. Further, the elongated apertures 25 and 25' are so configured that the drive axle 15 of the calibration coupler 14 extends therethrough and is supported by the guide walls 23 and 23' in such a manner as to enable the axle to slidably move within the apertures 25 and 25'. The frame member 18, which may be considered as the guide or reference handle of the stapling instrument 10, has an open face on the side furthest removed from the frame member 17.

Positioned within the rigid frame 16 and constituting the remaining components of the base handle assembly 11 are a drive spring 26, a spring bolt 27 extending through one end of the spring 26 into a threaded aperture 28 in the frame member 18, a drive bar 29 positioned within the frame member 17, a replaceable staple driver 30 extending down into the hollow staple housing 19 and engaging the drive bar 29, a replaceable staple magazine 31 extending down into and engaging the staple housing 19, and a pivot pin 32 extending between the guide walls 23 and 23' and through the apertures 24 and 24'.

At one end of the drive bar 29, there is provided a notch 33 extending into which is one end of the drive spring 26. In the vicinity of the engagement of the drive spring 26 and the drive bar 29, the frame member 18 includes a slot 34 through which a portion of the drive spring 26 may pass upon the drive handle 13 applying a force thereto to the drive bar 29. The other end of the drive bar 29 includes a drive head 35 having a notch 36 therein which encompasses a support member 37 extending out from an inner wall of the staple housing 19. A vertical key 38 is provided in the drive head 35 for receiving in locking engagement therewith a vertical key 39 of the staple driver 30. The support member 37 insures that the drive head 35 is appropriately positioned within the staple housing 19, while the combination of the vertical keys 38 and 39 permits ready engagement of the staple driver 30 to the drive head 35 of the drive bar 29. Further, the staple driver 30 and the staple magazine 31 include overlap extensions 40 and 41 for facilitating the manual removal of the staple magazine 31 and the staple driver 30. To insure that the staple magazine 31 retains its appropriate alignment with respect to the anvil assembly 12, there are provided in the magazine key ways 42 and 43 through which a key rail 44 of the anvil assembly 12 may pass.

Extending in alignment with the frame member 17 and positioned about a portion thereof is the anvil assembly 12 of the stapling instrument 10. The anvil assembly 12 comprises a replaceable anvil 45 and an elongated anvil arm 46 pivotally connected to the rigid frame 16 by means of the drive axle 15 of the calibration coupler 14. The anvil arm 46 comprises an anvil claw 47, a hollow guide 48 defined by a base wall 49 and a pair of side walls 50 and 50', and a pair of parallel guide walls 51 and 51' which are extensions of the side walls 50 and 50'. Each of the guide walls 51 and 51' includes an elongated apertures 52 and 52', the major axis of which is smaller than and partially coincident with a major axis of the elongated apertures 25 and 25' in the guide walls 23 and 23'. Further, the elongated apertures 52 and 52' are directly opposite to each other and are so configured as to enable the drive axle 15 of the calibration coupler 14 to extend therethrough. Additionally, there is provided in the guide wall 51 a calibration pivot pin 53 which is engaged by the calibration coupler 14 as hereinafter described. The anvil claw 47, which is at the end of the anvil arm 46 furthest removed from the guide walls 51 and 51', is comprised of an anvil support 54 and an anvil base 55, the latter of which is perpendicular to the former and is in longitudinal offset with respect to the hollow guide 48. Provided on an exterior surface of the anvil support 54 is a notch 56, and at the intersection of the anvil support 54 and the anvil base 55, a cavity 57. The combination of the notch 56 and the cavity 57 provides a means whereby the replaceable anvil 45 may be secured against an inner surface of the anvil support 54. The previously mentioned key rail 44 of the anvil base 55 extends from the anvil support 54 only a limited distance so that the rail may be disengaged from the staple magazine 31.

The drive handle 13 of the stapling instrument 10 comprises a drive member 58 of uniform thickness and a handle member 59. The drive member 58 is slidably positioned between the guide walls 23 and 23' of the rigid frame 16 and includes a circular aperture 60 of sufficient diameter to permit the drive axle 15 of the calibration coupler 14 to extend therethrough. There is also included in the drive member 58 an elongated aperture 61 so positioned with respect to the circular aperture 60 that one end of the elongated aperture 61 is in close proximity to the aperture 60. A first portion of the elongated aperture 61 including such one end in close proximity to the aperture 60, is so configured that successive points along its center line in a direction away from said one end are at increasing distances from the axis of the aperture 60, while the remaining second portion of the elongated aperture 61 is so configured that successive points along its center line, also in a direction away from said one end, are at a constant distance from the axis of the aperture 60. The difference in distances between each endpoint along the center line of said first portion of the elongated aperture 61 and the axis of the aperture 60 corresponds to the longitudinal distance the drive axle 15 may move from one side of the elongated apertures 25 and 25' to the other. Slidably positioned within the elongated aperture 61 and extending through the apertures 24 and 24' of the rigid frame 16 is the pivot pin 32. Since the pivot pin 32 has a fixed position with regard to the rigid frame 16 (i.e., can only rotate within the apertures 24 and 24'), the angular movement of the handle member 59 toward the frame member 18 causes the drive axle 15 to move along the major axis of the elongated apertures 25 and 25' in a direction away from the apertures 24 and 24'. A side wall 62 of the drive member 58 comprises a circular portion 63 which is concentric to the elongated aperture 61, and a protruding portion 64 which is so configured as to drive the spring 26 into the slot 34 of the rigid frame 16 upon the drive handle 13 being rotated in the direction of frame member 18 beyond a predetermined angular position. During such rotation of the drive handle 13 beyond a predetermined angular position, the axle 15 is retained at a fixed position at one end of the elongated apertures 25 and 25', while the pivot pin 32 is positioned at various points along the center line of the second portion of the elongated aperture 61, such various points being equidistant from the center of the axle 15 at this time.

The calibration coupler 14 of the stapling instrument 10 is comprised of a wheel nut 65 and a calibration bolt 66, the latter comprising a calibration wheel 67 and the drive axle 15. In the face surface of the calibration wheel 67 nearest the guide wall 51 of the elongated anvil arm 46, there is provided an elongated arced slot 68 in which is positioned the calibration pin 53 of the guide wall 51. The axis of the axle 15 and the position of the arced slot 68 are so related that rotation of the calibration wheel 67 changes the position of the pin 53 within the arced slot 68, and the position of the drive axle 15 along the major axis of the elongated apertures 52 and 52' in the guide walls 51 and 51' of the anvil assembly 12.

The operation of the instrument 10, including the manner in which the various components thereof interact with each other, may best be summarized by considering its operation from a closed condition to an opened condition (i.e., from the condition wherein the distance between the replaceable anvil 45 and the replaceable staple magazine 31 is maximum to the condition wherein the anvil and the magazine are adjacent to each other).

Figure 1:
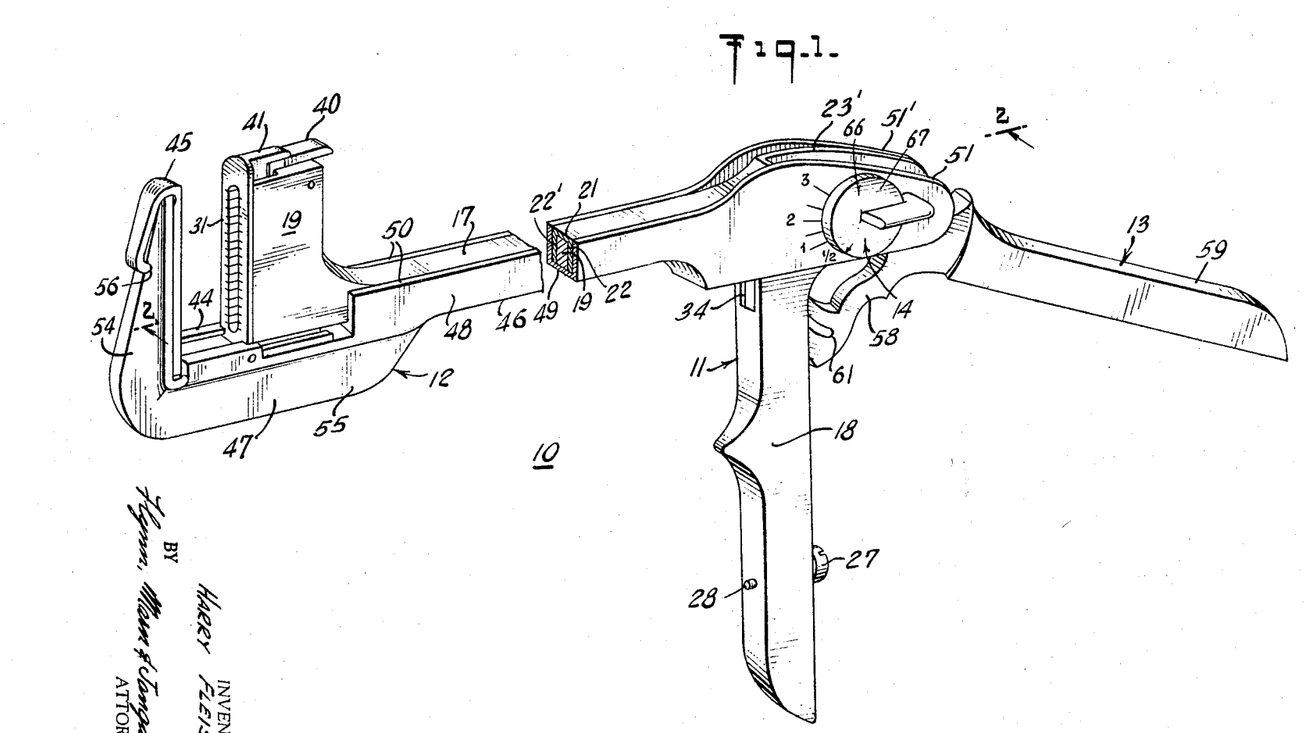
FIGURE 1 is a perspective view of a stapling instrument in accordance with the instant invention.
Figures 2, 3, 4, 5:
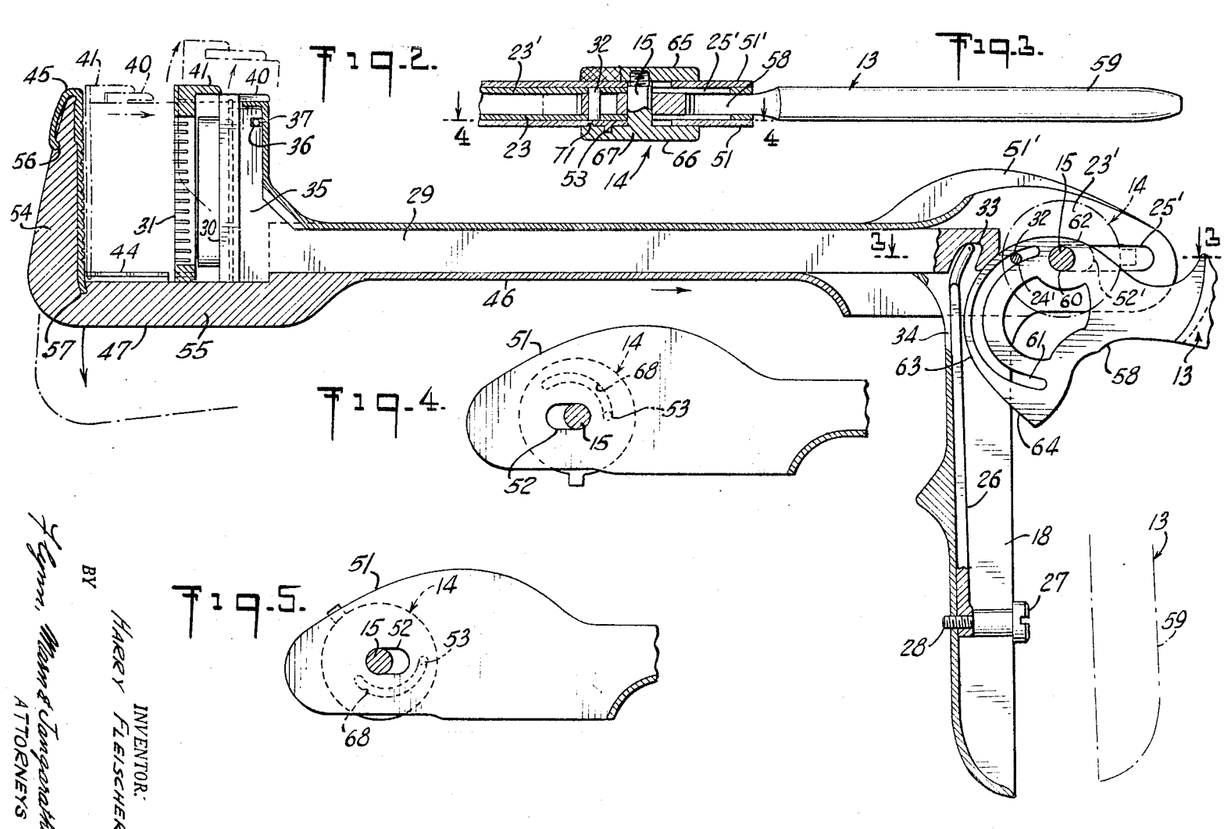
FIGURE 2 is a sectional view of the instrument depicted in FIGURE 1, taken along 2—2, illustrating in detail the various parts of the instrument and their relationship to each other.
FIGURE 3 is a top sectional view of a portion of the instrument depicted in FIGURE 1, taken along 3—3 of FIGURE 2.
FIGURES 4 and 5 are sectional views taken along 4—4 of FIGURE 3 so as to illustrate the features of a calibration coupler and the manner in which its axial position may be varied so as to alter the effective length of a movable anvil assembly.
Figure 2A:
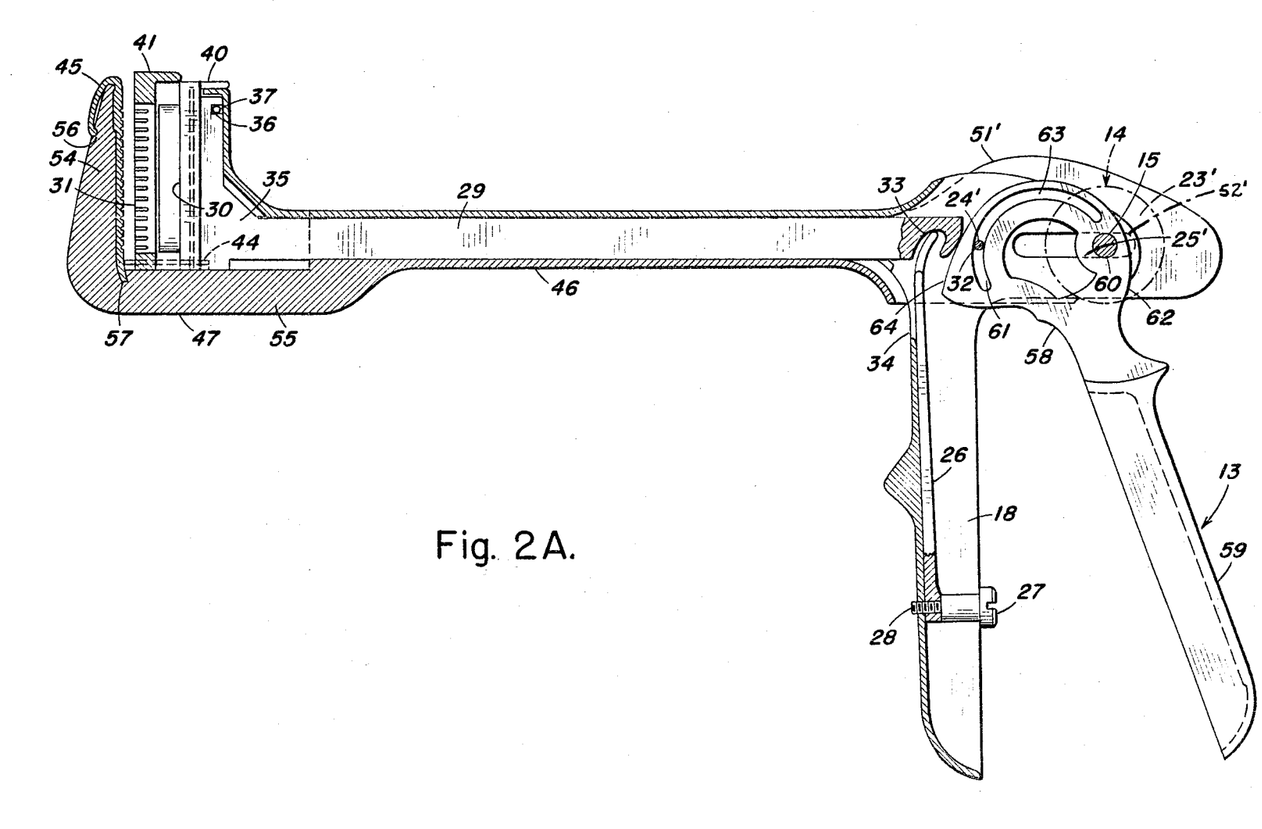
FIGURES 2A and 2B are sectional views corresponding to FIGURE 2, illustrating in detail the position of the various parts of the instrument when the handle is moved from the horizontal position as illustrated in FIGURE 2, toward a vertical position as illustrated in FIGURE 2B, FIGURE 2A illustrating the intermediate position of the handle.
Figure 2B:
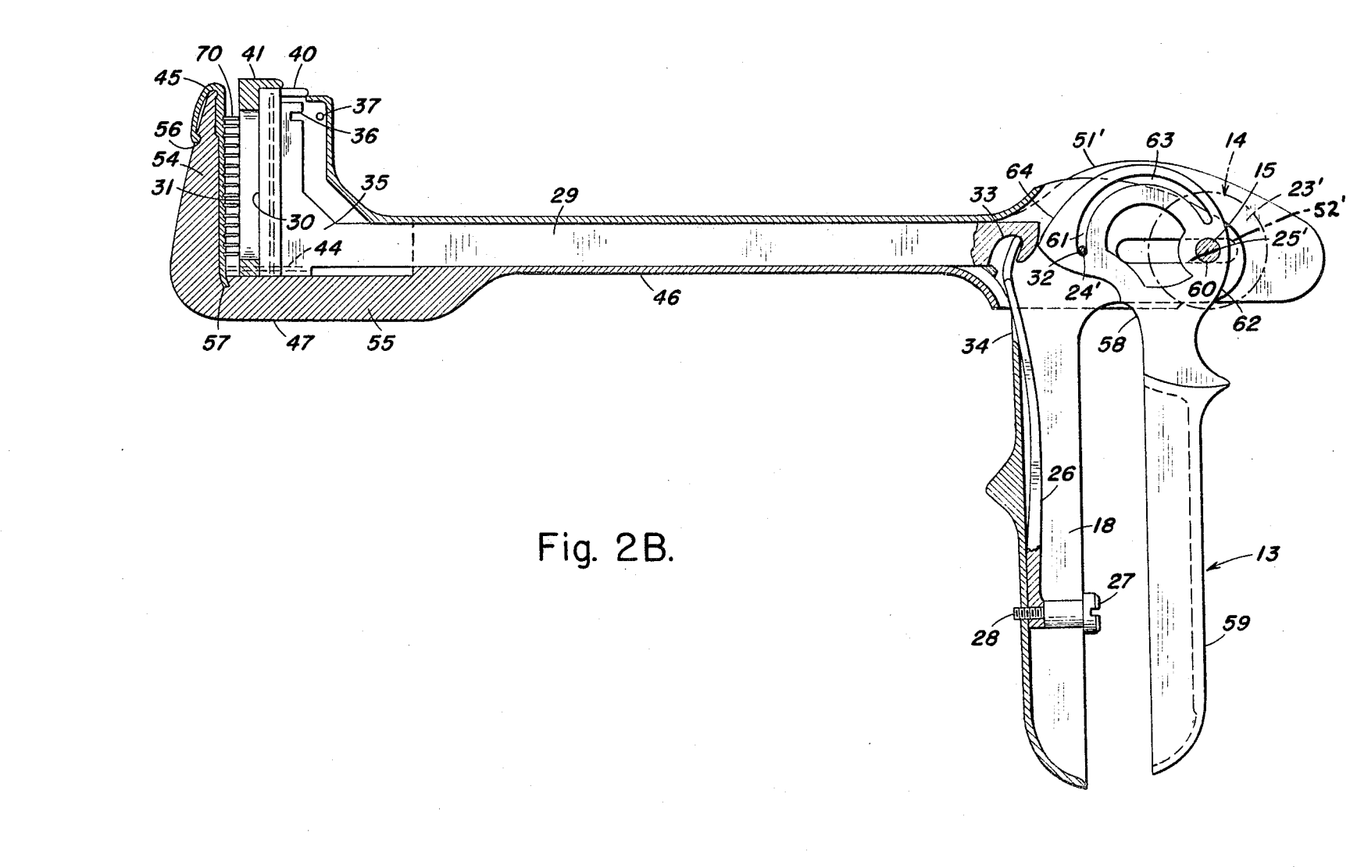

As illustrated in FIGURE 2, the replaceable anvil 45 and the replaceable staple magazine 31 are furthest apart when the drive handle 13 is approximately perpendicular to the frame member 18. Since, in this condition, there is ample distance between the anvil 45 and the magazine 31, and since the magazine 31 is not engaged by the key rail 44, the anvil 45, the staple magazine 31, and the staple driver 30 may readily be removed for replacement or sterilization. Further, in this condition, the anvil assembly 12 and the base handle assembly 11 may be rotated with respect to the base handle assembly 11 about the axis of drive axle 15. Since calibration pin 53 is integral with the guide wall 51, and since the calibration wheel 67 of the coupler 14 is held relatively tight against the guide wall 51, pin 53 remains in the same position in the arced slot 68 as the wheel 67 is carried and rotated by the anvil assembly 12 about the axis of the drive axle 15. also, the pivot pin 32 is, as illustrated in FIGURE 2, positioned at a point within the elongated curved aperture 61 which is in close proximity to the end of the elongated aperture 25', within which the drive axle 15 is positioned. Since pivot pin 32 does not engage the anvil assembly 12, the rotation of the latter does not affect the former.

The combination of the fixed axial position of the pivot pin 32 extending between the apertures 24 and 24' and the restricted mobility of the drive axle 15 within the apertures 25 and 25' causes the drive axle 15 to move longitudinally away from the pivot pin 32 upon the drive handle 13 being rotated toward the frame member 18. During such angular rotation, the drive axle 15 moves longitudinally from one end of each of the elongated apertures 25 and 25' to the other, carrying the anvil assembly 12 along with it and, thus, moving the replaceable anvil 45 toward the replaceable staple magazine 31. As the anvil assembly 12 is so moved, the key rail 44 engages the staple magazine 31 and the staple housing 19 so as to assure the proper alignment of the anvil 45 with respect to the magazine 31. Since the circular portion 63 and the elongated aperture 61 of the drive member 58 are concentrically related, the drive bar 29 is unaffected by the rotation of the drive handle 13 during the time interval the drive axle 15 is moving longitudinally within the apertures 25 and 25'. However, at the time the drive axle 15 has completed its longitudinal movement, the protruding portion 64 of the drive member 58 moves into engagement with the drive bar 29, causing a portion of the drive spring 26 to extend through the slot 34 in the frame member 18. Upon the drive spring 26 being so extended, the drive bar 29 is propelled in the direction of the staple magazine 31. Since the staple driver 30 and the drive head 35 of the drive bar 29 are keyed together by means of the vertical keys 38 and 39, such movement of the drive bar 29 carries the staple driver 30 toward and into engagement with the staple magazine 31 so as to eject a plurality of staples 70 stored therein.

Accordingly, the rotation of the drive handle 13 toward the frame member 18 results in two distinct but consecutive functions. First, as the drive axle 15 moves longitudinally within the apertures 25 and 25', the anvil assembly 12 is moved toward the staple magazine 31 and, thus, the distance between the anvil 45 and the magazine is adjusted. Second, upon completion of the longitudinal movement of the drive axle 15, from one side of the apertures 25 and 25' to the other the continued rotation of the drive handle 13 causes the staples 70 to be ejected from the staple magazine 31 through the organ to be sutured, and into engagement with the anvil 45 which has a plurality of indentations 71 to clinch the staples 70 in place.

Figure 15:
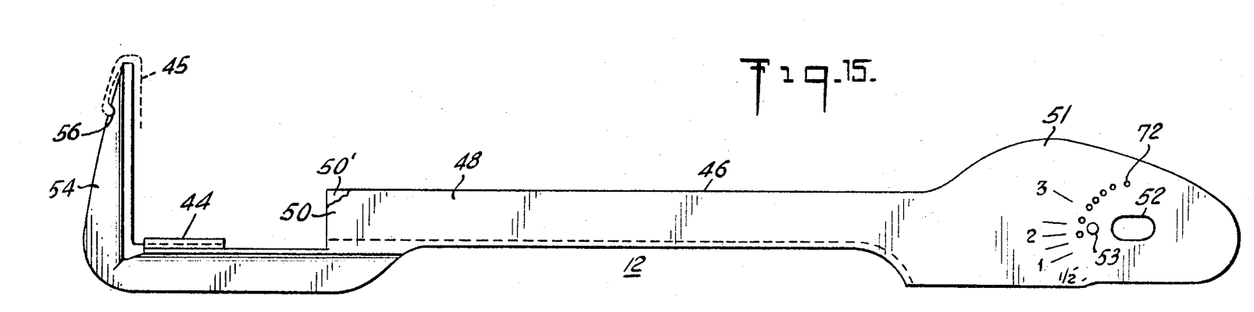
FIGURE 15 is a front view of the anvil assembly of the instrument of FIGURE 1.

To provide a means whereby the minimal or stapling distance between the anvil 45 and the magazine 31 may have one of a plurality of minimum values for a particular instrument setting, there is provided the calibration coupler 14 which cooperates with the anvil assembly 12 to vary the effective length of the latter. As illustrated in FIGURES 4 and 5, the drive axle 15 may assume various positions within the aperture 52 in accordance with the angular position of the calibration wheel 67. As the wheel 67 is rotated, the calibration pin 53 extending out from the guide wall 51 assumes a different position within the arced slot 68 of the calibration wheel 67. Since the relative position of the slot 68 with respect to the drive axle 15 is fixed, such rotation causes the drive axle 15 to move longitudinally within the aperture 52 in accordance with the position of the pin 53 within the slot 68. Accordingly, as the calibration wheel 67 is rotated, for example, from a predetermined position designated "½" units to a second predetermined positioned designated "3" units, the drive axle 15 is moved from the left side of the aperture 52 to the right side of such aperture, as viewed in FIGURE 15, thus varying the effective length of the anvil assembly 12 which, in turn, determines the minimum distance between the anvil 45 and the magazine 31.

As illustrated in FIGURE 2, the drive axle 15 is positioned in the left end of aperture 52', the position of the axle 15 when the calibration wheel 67 is at the "½" position. To provide a desired minimum distance between the anvil 45 and the magazine 31 upon the rotation of drive handle 13 and the completion of the longitudinal movement of the drive axle 15 from one side of the aperture 25 to the other, the calibration wheel 67 is rotated to a position between "½" and "3" prior to the rotation of the handle. As a consequence of such positioning of the calibration wheel 67, the drive axle 15 assumes a position within the aperture 52 which is further removed from the replaceable anvil 45. Since the spacial position of the drive axle 15 is dependent upon (1) the position of the drive handle 13 and (2) the angular position of the drive handle 13 with respect to the frame member 18, maintaining the frame member 18 and the drive handle 13 in the position illustrated in FIGURE 2 while rotating the calibration wheel 67 from the "½" position to, for example, the "3" position, causes the anvil assembly 12 to move toward the left, as viewed in this figure. Accordingly, the open condition distance between the anvil 45 and the magazine 31 may be varied in accordance with the angular position of the calibration wheel 67. The distance the anvil assembly 12 is moved because of the rotation of the drive handle 13 is dependent upon the length of the major axes of the apertures 25 and 25' and, thus, is a constant. Accordingly, the distance between the anvil 45 and the magazine 31 for the closed or stapling condition of the instrument 10 is determined by the position of the calibration wheel 67.

To facilitate the rotation of the calibration wheel 67 by predetermined increments, there are provided a plurality of indentations 72 on the surface of the guide wall 51 and an indent pin 71 on the surface of the calibration wheel 67 adjacent to the wall 51. The position of each of the indentations 72 is associated with one of the calibration positions "½" through "3" as inscribed on the wall 51 and is adapted to receive therein the indent pin 73 when the calibration wheel 67 is rotated to such position.

To enable the stapling instrument 10 to provide one of a plurality of multi-stitch designs for each stapling operation of the instrument (i.e., for each rotation of the drive handle 13), there are provided alternative combinations of cooperating staple magazines and staple drivers which may be interchangeably utilized in the instrument 10. A first such combination is the staple magazine 31 and the staple driver 30.

Figures 6, 7, 8, 9, 10:
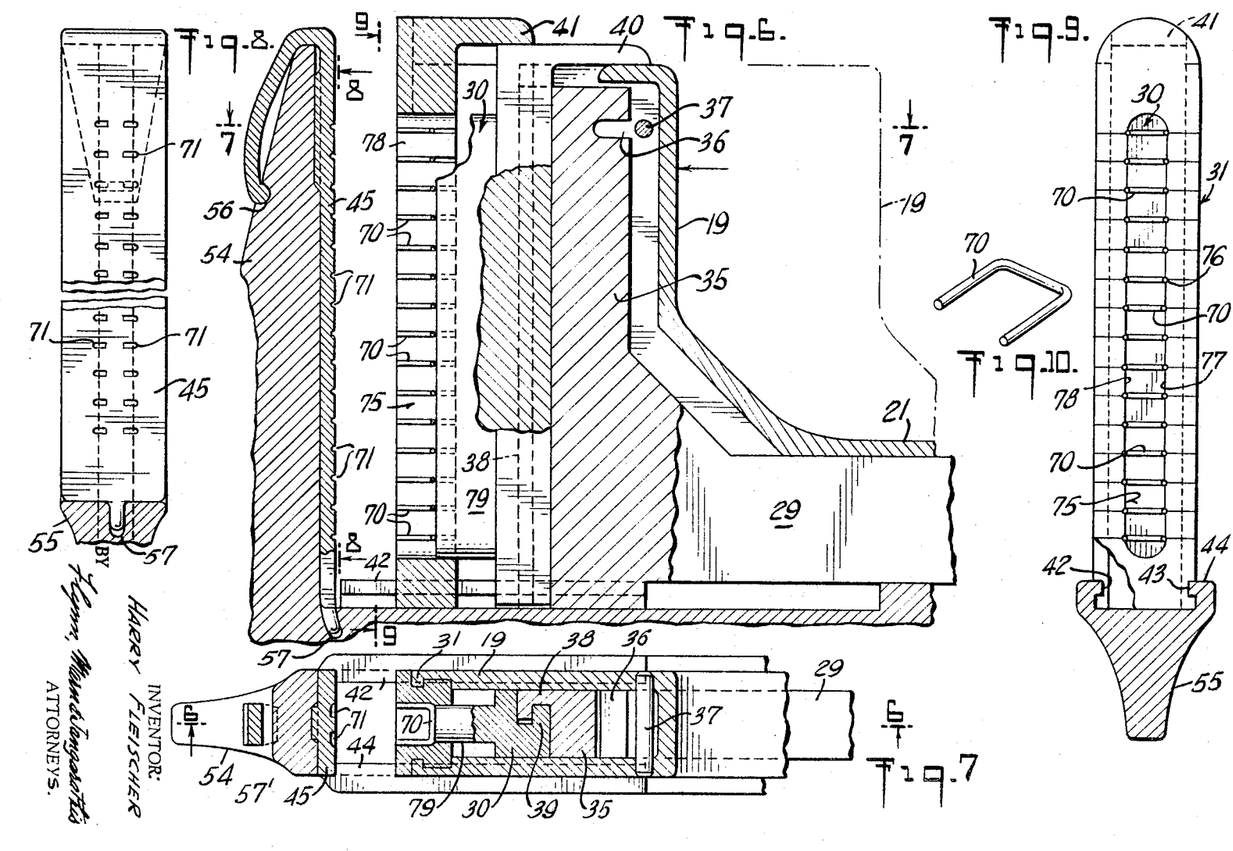
FIGURE 6 is a sectional view of the left end portion of the instrument depicted in FIGURE 1, illustrating in detail the cooperating elements directly associated with the driving of a multiplicity of staples.
FIGURE 7 is a top sectional view taken along 7—7 of FIGURE 6.
FIGURE 8 is a front view of a replaceable anvil, taken along 8—8 of FIGURE 6.
FIGURE 9 is a front view of a replaceable staple magazine and staple driver taken along 9—9 of FIGURE 6.
FIGURE 10 is a perspective view of a staple of the type stored within the magazine depicted, for example, in FIGURE 9.
Figures 11, 11A, 11B, 11C, 12, 13, 13A, 14, 14A, 14B:
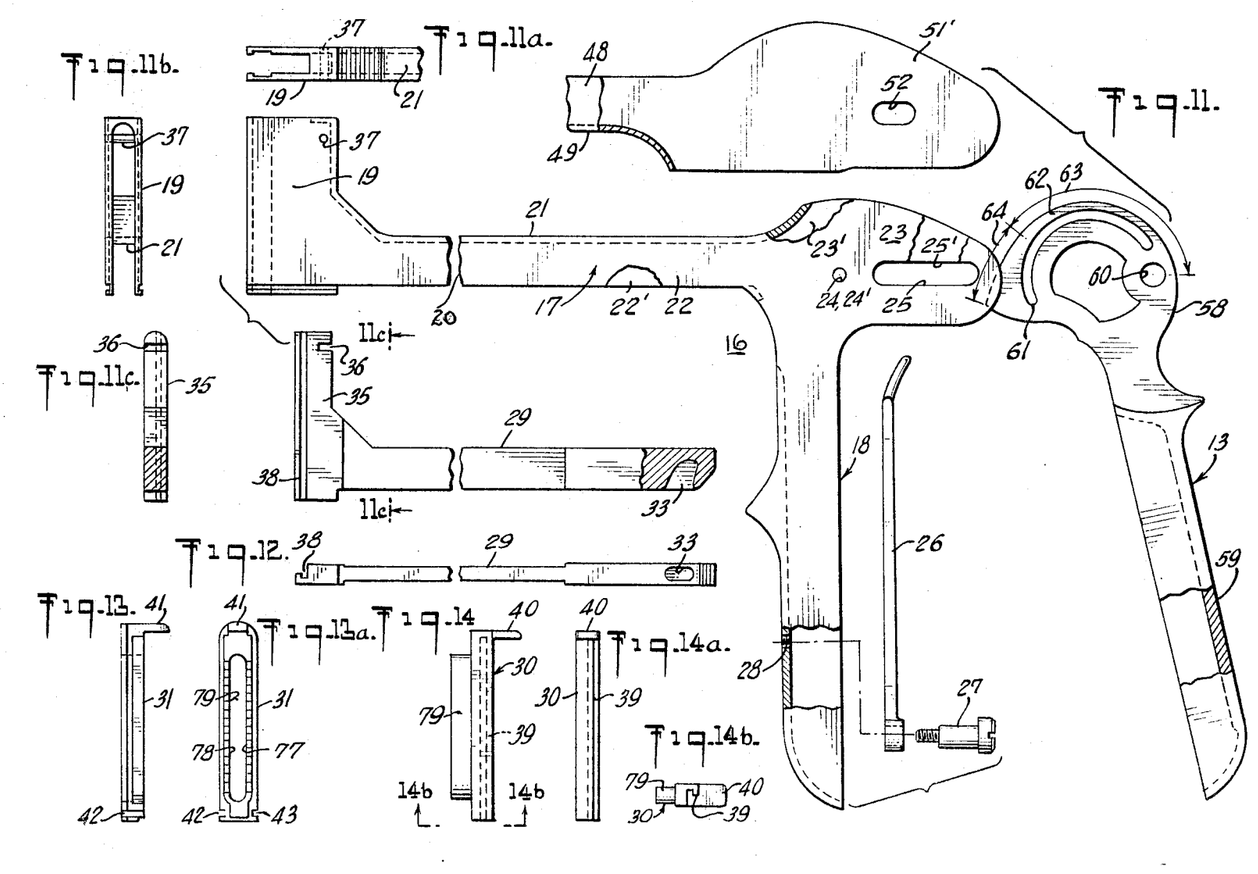
FIGURE 11 is an exploded view, with parts broken away and in section for greater clarity, showing various elements of the instrument of FIGURE 1 completely disassembled.
FIGURE 11a is a top plan view of the left end portion of the rigid frame depicted in FIGURE 11, such portion defining a hollow staple housing.
FIGURE 11b is a side elevation view of the left end portion of the hollow staple housing.
FIGURE 11c is a sectional view of a drive bar, taken along 11c—11c of FIGURE 11.
FIGURE 12 is a bottom view of the drive bar depicted by FIGURE 11.
FIGURES 13 and 13a are side and front views, respectively, of the replaceable staple magazine utilized in the instrument of FIGURE 1.
FIGURES 14, 14a and 14b are side, front and bottom views, respectively, of a replaceable staple driver of the type utilized in the instrument of FIGURE 1.

To assure that the staples 70 positioned within and extending across an elongated aperture 75 of the magazine 31 are properly aligned with respect to each other, a plurality of parallel grooves 76 is inscribed in a pair of internal side walls 77 and 78 of the magazine 31. The grooves 76 not only facilitate the placement of the staples 70 into the magazine 31, but, also, assure that the staples are properly directed when the driver 30 is extended into the magazine 31. The staple driver 30 includes a drive extension 79 whose configuration complements the elongated aperture 75 so as to enable it to pass through the aperture 75 upon the activation of the staple driver 30 by the elongated drive bar 29. As illustrated in FIGURE 6, the drive extension 79 engages the staples 70 so as to expel them from the magazine 31 as the driver 30 continues through the elongated aperture 75 of the magazine 31.

Figures 12A, 16, 17, 18:
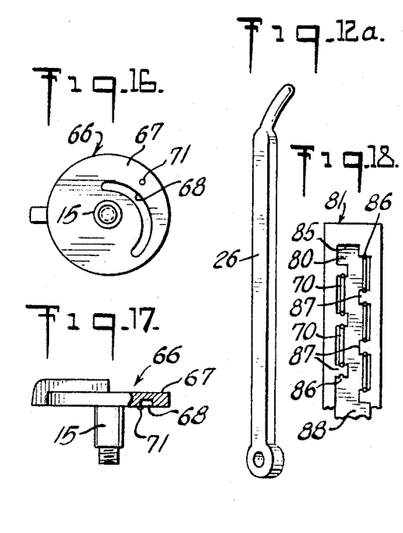
FIGURE 12a is a perspective view of the drive spring of the instrument of FIGURE 1.
FIGURES 16 and 17 are top and front views, respectively, of a calibration bolt of the instrument of FIGURE 1.
FIGURE 18 is a front view of an alternative staple magazine and its associated staple driver.

A second such combination comprises, as depicted in FIGURE 18, a staple magazine 81 and a staple driver 80, which provide a stitching design characterized by parallel lines of staples. The staple magazine 81 includes an aperture 85 having a plurality of support steps 87 adjacent ones of which are adapted to receive the staples 70 within a plurality of staple grooves 86. As illustrated in this figure, the steps 87 on opposite sides of the aperture 85 are alternatively disposed so as to accommodate alternatively disposed lines of staples. (It is, in accordance with the instant invention, also contemplated that the steps on opposite sides of the aperture may be positioned opposite to each other so as to accommodate lines of staples wherein oppositely positioned staples are aligned with respect to each other.) The staple driver 80 includes a drive extension 88 whose configuration complements the aperture 85 and is adapted to expel the staples 70 stored in the magazine 81 upon the driver being extended into the magazine.

Figures 19, 20, 23:
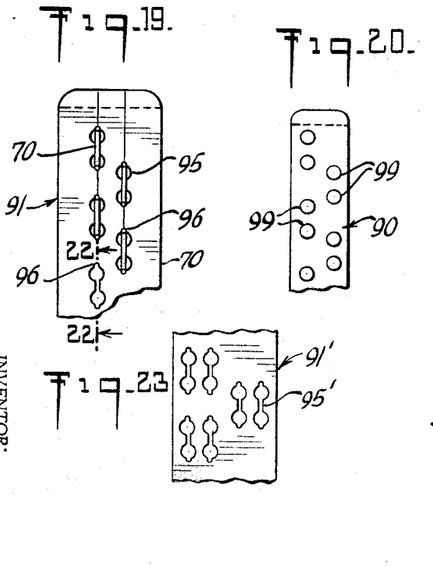
FIGURES 19 and 20 are front views of a second alternative staple magazine and associated staple driver.
FIGURE 23 is a front view of a portion of a third alternative staple magazine including four columns of staples.
Figures 21, 22:
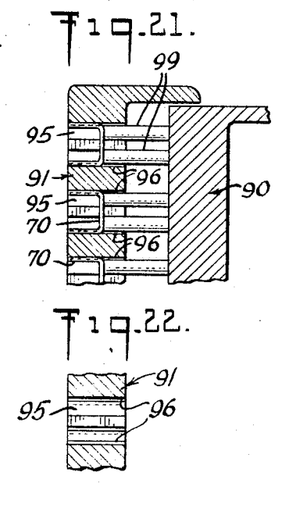
FIGURES 21 and 22 are sectional views of the staple magazine and staple driver of FIGURES 19 and 20, interacting with each other for expelling staples stored in the former.

With regard to FIGURES 19, 20, 21 and 22, there is depicted a third such combination, which comprises a staple magazine 91 and a staple driver 90. The staple magazine 91 includes a plurality of apertures 95, each of which has a bar bell configuration and is adapted to receive a staple 70 therein. At each end of each of the apertures 95, there is provided a staple groove 96 within which a portion of the staple 70 extends for proper positioning of the staple in the magazine 91, and proper alignment of the staple as it is being expelled from the magazine by the driver 90. The driver 90 includes a plurality of pairs of drive rods 99, each such pair being aligned with an aperture 95 for passage therethrough. Although the apertures 95 are, as illustrated in FIGURE 19, arranged in two columns, they may also be arranged in four columns as illustrated in FIGURE 23, or in other design arrangements dictated by the surgical requirements. For any change in the positioning of the pairs of apertures 95, there would be a corresponding change in the orientation of the pairs of drive rods 99.

The three combinations of staple magazines and associated staple drivers described above and depicted in the various figures not only enable the instrument 10 to provide a plurality of multi-stitch designs, but also render the instrument 10 durable. More specifically, the drive extension 79 of the staple driver 30, the drive extension 88 of the staple driver 80, and the pairs of drive rods 99 of the staple driver 90 are of such thickness as not to be easily bent or broken under normal handling conditions. Accordingly, the ability of the staple drivers 30, 80 and 90 to resist damage insures the proper expulsion of the staples 70 during any operation of the instrument 10 employing such combinations.

It will be obvious to those skilled in the art that various changes may be made in the invention without departing from the spirit and scope thereof and, therefore, the invention is not limited by that which is shown in the drawings and described in this specification, but only as indicated in the appended claims.

I claim:
1. A stapling instrument for performing surgical operations, comprising:
  (a) a handle assembly, including a frame member, a staple magazine and a staple drive means;
  (b) a coupling means comprising a drive axle extending through said frame member;
  (c) an elongated anvil assembly pivotally coupled by said drive axle to said frame member and extending in alignment with a portion thereof;
  (d) a drive handle means positioned partially within and pivotally coupled by said drive axle to said frame member and said anvil assembly, said drive handle means comprising a drive anvil having a first aperture through which said drive axle extends, an elongated curved aperture, one end of which is in close proximity to said first aperture, and a side wall, a portion of which protrudes away from a portion of said elongated curved aperture remote from said first aperture;
  said drive handle means being adapted to move said drive axle and said anvil assembly a predetermined longitudinal distance upon the angular rotation of said handle means, and to extend said staple drive means into said staple magazine upon the continuance of the rotation of said handle means.

2. A stapling instrument in accordance with claim 1, wherein
  said frame member includes a pair of elongated apertures through which said drive axle also extends; and
  said handle assembly includes a pivot means extending through said frame member and said elongated curved aperture of said drive member,
whereby upon the rotation of said drive handle means in the direction of said frame member, said drive axle moves longitudinally within said elongated apertures of said frame member as said elongated curved aperture of said drive member moves about said pivot means.

3. A stapling instrument in accordance with claim 1, wherein
  said coupling means comprises an adjustable nut and a calibration bolt, the latter including said drive axle and a calibration member having an elongated arced slot in the surface thereof adjacent said anvil assembly; and
  said anvil assembly includes a pair of elongated apertures through which said drive axle extends, and a calibration pin which extends into said elongated arced slot of said calibration member,
whereby the position of said drive axle within said pair of elongated apertures of said anvil assembly is dependent upon the angular position of said calibration member.

4. A stapling instrument in accordance with claim 1, wherein said staple drive means includes a drive bar and a replaceable staple driver attached thereto, said staple magazine positioned within said frame member being aligned with said staple driver for enabling the latter to be extended into the former.

5. A stapling instrument in accordance with claim 4, wherein said anvil assembly comprises a replaceable anvil and an elongated anvil arm, said replaceable anvil being in alignment with and parallel to said staple magazine, and said elongated anvil arm extending in alignment with a portion of said frame member and being responsive to the longitudinal movement of said drive axle.

6. A stapling instrument in accordance with claim 5, wherein said elongated anvil arm comprises a key portion which engages said staple magazine upon the movement of the replaceable anvil towards said staple magazine, such engagement assuring the proper alignment of said replaceable anvil with respect to said staple magazine.

7. A stapling instrument in accordance with claim 6, wherein
said drive bar and said replaceable staple driver include engaging vertical keys; and
said staple magazine and said frame member include a vertical key arrangement,
whereby said staple magazine and said replaceable staple driver may readily be removed from said instrument upon said key portion being disengaged from said staple magazine.

8. A stapling instrument in acordance with claim 3, wherein
said calibration member includes an indent pin extending therefrom; and
said anvil assembly includes a plurality of indentations each adapted to receive therein said indent pin, each of said indentations being associated with one position of said drive axle within said pair of elongated apertures of said anvil assembly.

9. The combination of a staple magazine and staple driver, wherein
said staple magazine includes a pair of internal side walls, each having a plurality of staple grooves positioned therein and defining a portion of an elongated aperture extending through said magazine; and
said staple driver includes a drive extension whose configuration complements said elongated aperture of said staple magazine so as to enable said extension to pass at least partially through said aperture.

10. The combination of a staple magazine and staple driver, wherein
said staple magazine includes an elongated aperture extending therethrough, said aperture being at least partially defined by a pair of side walls, each of which includes a plurality of support extensions adjacent ones of which include a plurality of staple grooves; and
said staple driver includes a drive extension whose configuration complements said elongated aperture of said staple magazine so as to enable said extension to pass at least partially through said aperture.

11. The combination of a staple magazine and a staple driver, wherein
said staple magazine includes a plurality of apertures extending therethrough, each of said apertures including a pair of staple grooves and two enlarged end portions; and said staple driver includes a plurality of pairs of drive rods, each of said pairs being aligned with one of said plurality of apertures of said staple magazine so as to enable said drive rods to pass at least partially through said enlarged end portions.

12. A stapling instrument for performing multiple stitching operations, comprising:
(a) a handle assembly, including a rigid frame having a pair of elongated apertures extending therethrough, a drive spring attached at one end to said rigid frame, a pivot rod extending through said rigid frame, a drive bar positioned within said rigid frame and coupled at one end thereof to said drive spring, a staple driver insertable into said rigid frame and attachable to the other end of said drive bar, and a staple magazine insertable into said rigid frame and attachable to an end portion thereof;
(b) a coupling means, including an adjustable nut and a calibration bolt, the latter comprising a calibration member and a drive axle extending through the elongated apertures of said rigid frame;
(c) an elongated anvil assembly pivotally coupled by said drive axle to said rigid frame and extending in alignment with the portion of said frame including said drive bar, said staple driver and said staple magazine, said anvil assembly including an elongated anvil arm having a pair of elongated apertures extending therethrough and an anvil attachable to said elongated anvil arm; and
(d) a drive handle means positioned partially within and pivotally coupled by said drive axle to said rigid frame and said elongated anvil arm, said drive handle means including a drive portion of uniform thickness having a circular aperture, an elongated curved aperture through which said pivot rod extends and a side wall a first portion of which is curved so as not to engage said drive bar as the drive handle means is rotated within predetermined angular positions and a second portion of which protrudes away from said elongated curved aperture so as to propel said drive bar upon said drive handle means being rotated beyond said predetermined angular positions toward said rigid frame,
whereby, upon the rotation in the direction of said rigid frame of said drive handle means between said predetermined angular positions, said drive axle is moved longitudnially within said elongated apertures of said rigid frame, and said elongated anvil arm is moved longitudinally so as to place said anvil in a position with respect to said staple magazine appropriate for stapling and, upon the further rotation of said drive handle means in such direction beyond said predetermined angular positions, said drive bar is activated so as to extend said staple driver into said staple magazine.

13. A stapling instrument in accordance with claim 12, wherein
said calibration member includes an elongated arced slot in the surface thereof adjacent said elongated anvil arm; and
said elongated anvil arm includes a calibration pin which extends into said elongated arced slot of said calibration member,
whereby the position of said drive axle within said pair of elongated apertures of said elongated anvil arm is dependent upon the angular position of said calibration member.

14. A stapling instrument in accordance with claim 12, wherein
said elongated anvil arm comprises a key portion which engages said staple magazine upon the movement of said anvil toward said staple magazine, such engagement assuring the proper alignment of said anvil with respect to said staple magazine.

15. A stapling instrument in accordance with claim 14, wherein
said drive bar and said staple driver include engaging the vertical keys; and
said staple magazine and said rigid frame include a vertical key arrangement,
whereby said staple magazine and said staple driver may readily be removed from said instrument upon said key portion being disengaged from said staple magazine.

16. A stapling instrument in accordance with claim 13, wherein
said calibration member includes an indent pin extending therefrom; and said elongated anvil arm includes a plurality of indentations each adapted to receive therein said indent pin, each of said indentations being associated with one position of said drive axle within said pair of elongated apertures of said elongated anvil arm.

17. A stapling instrument in accordance with claim 12, wherein
- said staple magazine includes a pair of internal side walls, each having a plurality of staple groves positioned therein and defining a portion of an elongated aperture extending through said magazine; and
- said staple driver includes a drive extension whose configuration complements said elongated aperture of said staple magazine so as to enable said extension to pass at least partially through said aperture.

18. A stapling instrument in accordance with claim 12, wherein
- said staple magazine includes an elongated aperture extending therethrough, said aperture being at least partially defined by a pair of side walls each of which includes a plurality of support extensions adjacent ones of which include a plurality of staple grooves; and
- said staple driver includes a drive extension whose configuration complements said elongated aperture of said staple magazine so as to enable said extension to pass at least partially through said aperture.

19. A stapling instrument in accordance with claim 12, wherein
- said staple magazine includes a plurality of apertures extending therethrough, each of said apertures including a pair of staple grooves and two enlarged end portions; and said staple driver includes a plurality of pairs of drive rods, each of said pairs of drive rods being aligned with one of said plurality of apertures of said staple magazine so as to enable said drive rods to pass at least partially through said enlarged end portions.

No references cited.

GRANVILLE Y. CUSTER, JR., *Primary Examiner.*